United States Patent [19]
Lan

[11] Patent Number: 5,276,937
[45] Date of Patent: Jan. 11, 1994

[54] WINDSHIELD WIPER PRESSURE INCREASING AND WARNING AID

[76] Inventor: Ching-Hwei Lan, No. 9 Alley 1, Lane 458, Yuang Ho Rd., Chung Ho City, Taiwan

[21] Appl. No.: 5,044

[22] Filed: Jan. 15, 1993

[51] Int. Cl.⁵ .............................. B60S 1/04; B60S 1/02
[52] U.S. Cl. .............................. 15/257.01; 15/250.35; 15/250.001; 340/468; 362/80.1; 362/253; 180/271
[58] Field of Search ........... 15/250.01, 250.20, 250.42, 15/250.35, 250.41, 257.01; 340/468, 469, 471, 472, 473; 362/80.1, 253; 180/271; 116/28R 202

[56] References Cited
U.S. PATENT DOCUMENTS

| | | | |
|---|---|---|---|
| 2,387,953 | 10/1945 | Terry | 15/250.001 |
| 2,650,355 | 8/1953 | Pieczonka | 15/250.001 |
| 4,989,290 | 2/1991 | Hoshino | 15/250.42 |
| 5,170,527 | 12/1992 | Lyon, II | 15/250.42 |

FOREIGN PATENT DOCUMENTS

| | | | |
|---|---|---|---|
| 0223052 | 9/1989 | Japan | 15/250.001 |
| 1105704 | 3/1968 | United Kingdom | 15/250.42 |

Primary Examiner—Harvey C. Hornsby
Assistant Examiner—Gary K. Graham
Attorney, Agent, or Firm—Morton J. Rosenberg; David I. Klein

[57] ABSTRACT

A pressure increasing and warning aid for coupling to an automobile windshield wiper is provided. The device includes an opaque longitudinally extended wind pressure blade having a streamlined contour, and an illumination assembly disposed lengthwise therein. The light source of the illumination assembly is connected to the windshield wiper circuit. On a rainy day, as the windshield wiper operates, the wind pressure blade will be influenced by wind pressure, and will add to the wiper's action pressure, while simultaneously the illumination assembly will forwardly direct warning lights to other vehicles.

3 Claims, 4 Drawing Sheets

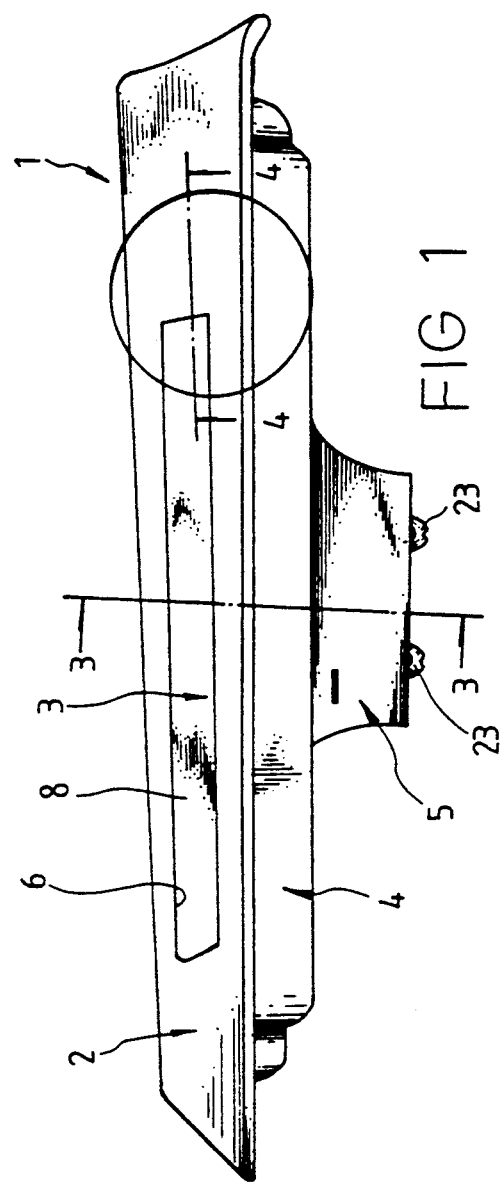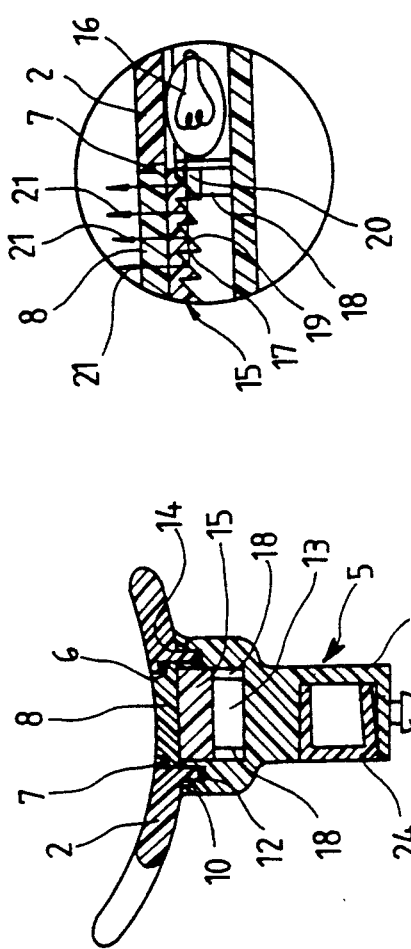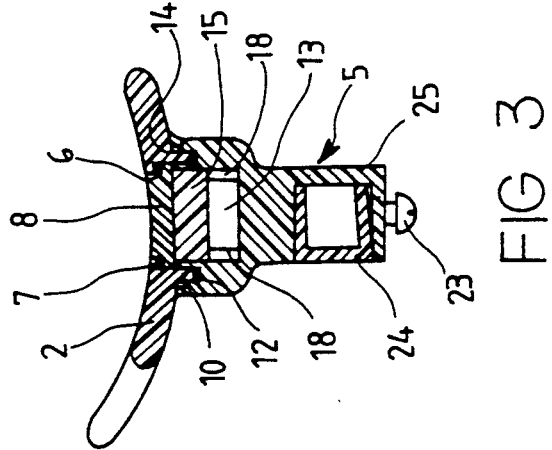

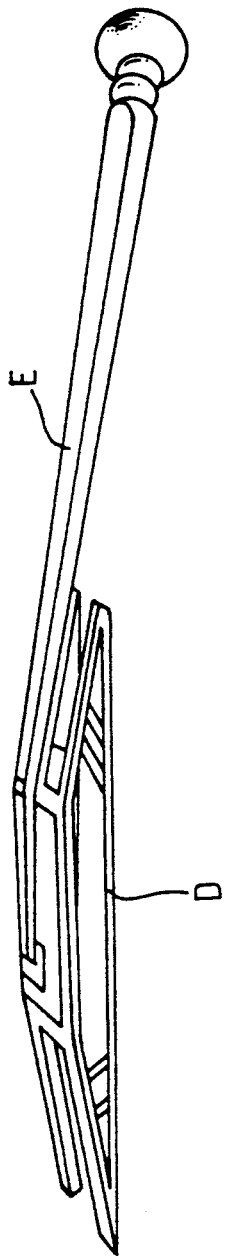
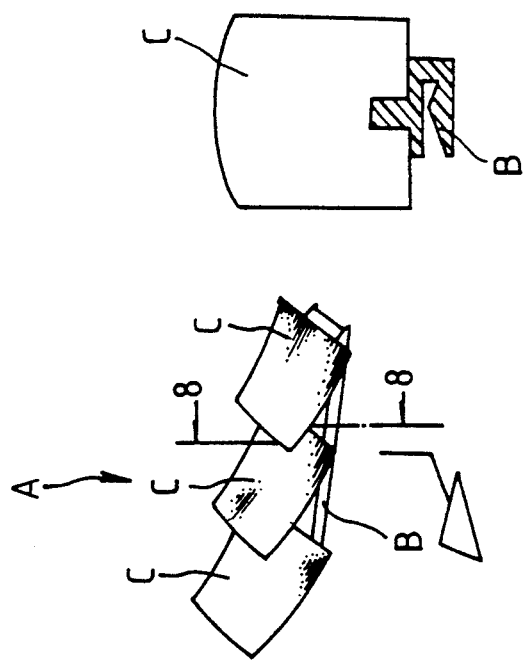
FIG 7 (PRIOR ART)
FIG 8 (PRIOR ART)

WINDSHIELD WIPER PRESSURE INCREASING AND WARNING AID

FIELD OF THE INVENTION

The present invention relates to a pressure increasing and warning aid for auto windshield wipers. Particularly, the present invention is directed to a newly devised assembly for coupling to the operating arm of a windshield wiper, where it adds to the wiper's action pressure for providing an improved wiping action. More in particular, the present invention provides a warning function visible to oncoming traffic and in the rear view mirrors of vehicles ahead thereof.

BACKGROUND OF THE INVENTION

Conventional auto windshield wipers operating under the restriction of a small action pressure cannot completely eliminate all of the rain drops from a windshield. Under such circumstances, the driver's vision on a rainy day is bound to be somewhat adversely affected. Therefore, a pressure increasing accessory A has been provided in an attempt to solve this problem, as shown in FIGS. 7, 8. This prior art system includes three inclined wind pressure blades C connected to a resilient clip B and installed to the operating arm E of the wiper D. In this way, by providing three wind pressure blades C which are impinged by the "wind" generated by the car's movement, the wiping effect of wiper D does get improved by an increased action pressure. But its function leaves room for improvement.

OBJECTS OF THE INVENTION

In view of the above-mentioned problem, the present invention provides a new pressure increasing and warning aid for automobile windshield wipers, with features including:

1. a streamlined, single-leaf wind pressure blade which is disposed in parallel relation with the windshield when not used, to thereby lower the car's wind resistance.

2. an illumination assembly having light transmission directed outwardly to provide a warning function without impairing the vision of the user.

SUMMARY OF THE INVENTION

A pressure increasing and warning aid includes a wind pressure blade for increasing pressure on a wiper blade and transmit a warning light from a central area thereof. The light is transmitted from an illumination assembly, which directs the light from a source disposed at one end thereof out from the front side. A back case in which the illumination assembly is accommodated, is connected to the back side of the wind pressure blade, and a fixing assembly is connected to the back side of the back case. On a rainy day, after being installed on the operating arm of a windshield wiper, the instant invention adds to the wiper action pressure, to provide a better wiping result, as well as provide a warning function.

BRIEF DESCRIPTION OF THE DRAWINGS

FIG. 1 is a perspective view of a preferred embodiment of the invention;

FIG. 3 is a sectional view taken along the section line 3—3 of FIG. 1;

FIG. 4 is a sectional view taken along the section line 4—4 of FIG. 1;

FIG. 7 shows a conventional pressure increasing aid for the auto windshield installed at its operating handle; and, FIG. 8 is a sectional view taken along the section line 8—8 of FIG. 7.

DESCRIPTION OF THE PREFERRED EMBODIMENTS

Figure 2:
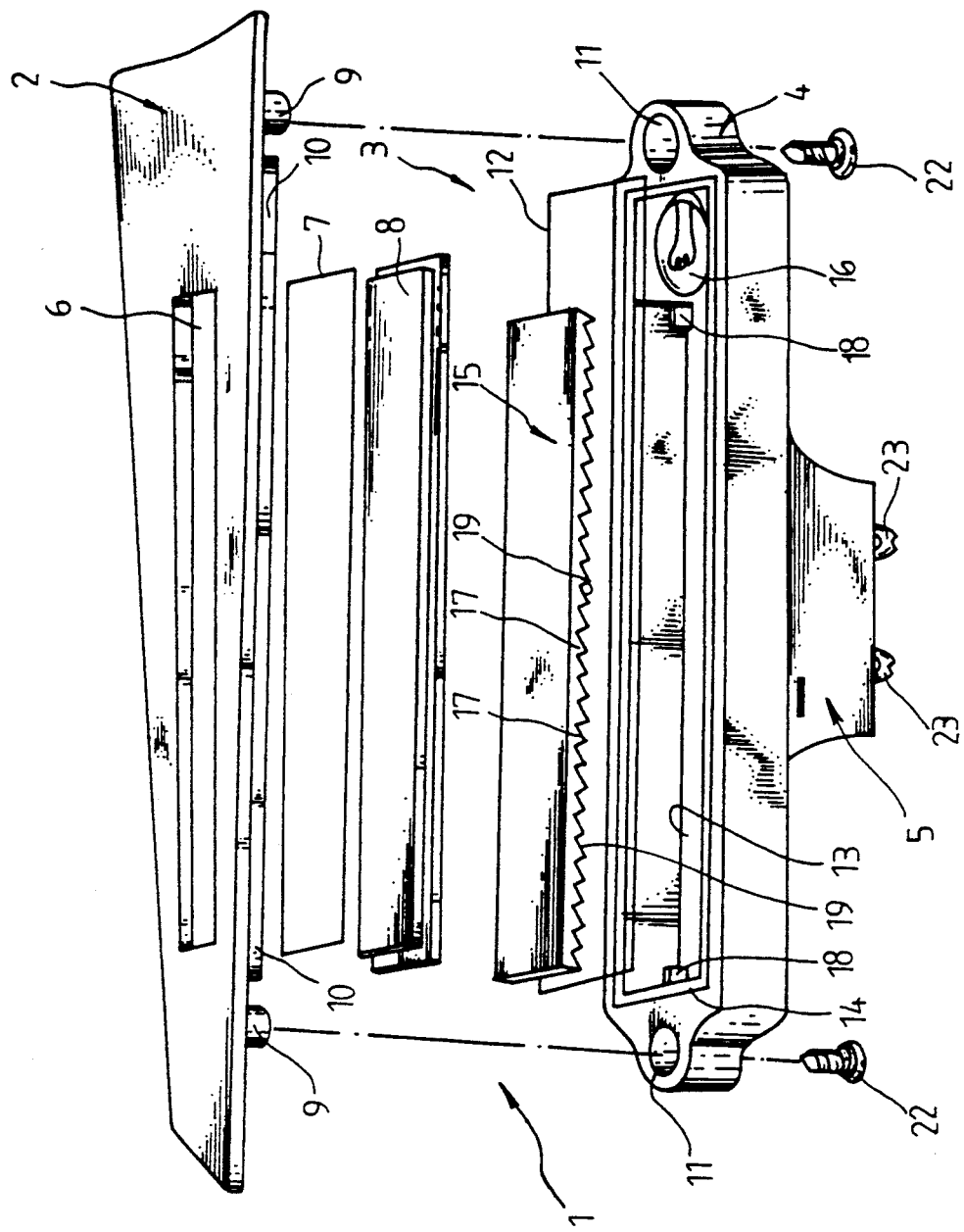
FIG. 2 is an exploded view of FIG. 1.

As FIGS. 1, 2 and 3 show, the pressure increasing and warning aid 1 of the present invention comprises a wind pressure blade 2, an illumination assembly 3, a back case 4 and a fixing assembly 5. Wind pressure blade 2 is an opaque long strip having a truncated conical contour and an arcuate cross-sectional contour to form a streamlined shape. Wind pressure blade 2 is formed with a longitudinally extended rectangular through opening 6, the opening 6 being filled by a translucent plate 8 of illumination assembly 3 by means of washer 7. On the rear side of the wind pressure blade there is formed convex frame 10 around the periphery of the through opening 6, and two positioning struts 9, each adjacent opposing ends of frame 10. The translucent plate 8 is inserted into the opening 6 from the rear side of blade 2. Then positioning struts 9 are both inserted into respective holes 11 formed in the back case 4, wherein they are fixed when the blade is assembled to the back case. During assembly the convex frame 10 is simultaneously inserted into an open-top annular recess 14 of back case 4 along with a washer 12, thereby sealing off the open rectangular cavity 13 which is formed in back case 4.

As shown in FIGS. 2 and 3, illumination assembly 3, installed between the rectangular cavity 13 of back case 4 and through opening 6 of wind pressure blade 2, consists of a translucent plate 8, a full reflective board 15 and a small lamp 16. The translucent plate 8 is a thin translucent plate having a red color and dimensioned to fit within the through opening 6 of wind pressure blade 2. By means of washer 7, through opening 6 is fully filled by the translucent plate 8. Full reflective board 15 is a transparent member dimensioned to f it within the rectangular cavity 13 of back case 4. Full reflective board 15 is provided with a planar front side, but has a back side integrally formed with transverse rows 17 of sequentially arranged 45° prisms. Full reflective board 15 is positioned within rectangular cavity 13 and supported thereat by four extended blocks 18, disposed adjacent to opposing corners of cavity 13. Positioned against one end of full reflective board 15 there is installed a small lamp 16, with its power cord coupled to the windshield wiper circuit (not shown). Therefore, as the windshield wiper operates, small lamp 16 is energized and transmits a light beam 20 into fully reflective board 15, as shown in FIG. 4. The light is thereby directed in a direction indicated by arrows 21, the 45° slant face of the transverse rows of prisms 17 providing internal reflection. As a result the prisms project light from the full reflective board front side to pass through the red translucent plate 8 to thereby display a red warning color.

Figure 6:
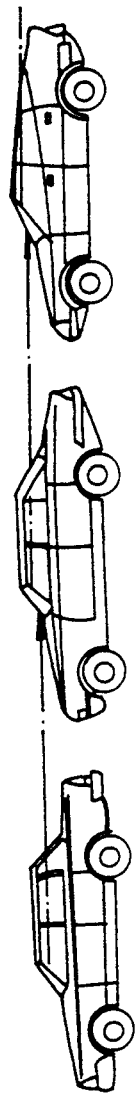
FIG. 6 depicts how the warning function of the invention works after being installed on the vehicle body.

As shown in FIGS. 2 and 3, back case 4 is an opaque longitudinally extended case having a closed bottom and an open top dimensioned to adapt to wind pressure blade 2. A rectangular cavity 13 formed in the central area of back case 4 accommodates illumination assembly 3. At both ends of the back case there are formed two holes 11, each of which receives a respective positioning strut 9 of wind pressure blade 2 which are secured therein by means of a screw 22 engaged within a central screw hole formed in the strut 9. Rectangular cavity 13 is entirely sealed off, as previously described. A fixing assembly 5 disposed at the back side of back case 4, includes a reverse C-shaped clamp member 25 which is integrally formed with back case 4, and two lock screws 23 installed from the rear side thereof, as shown in FIG. 3. In use, a metallic C-shaped clamp 24 is used to enclose the operating arm of the windshield wiper, the reverse C-shaped clamp 25 being used to secure the metallic C-shaped clamp by means of the lock screws 23. After installation, pressure increasing and warning aid 1 is disposed generally in parallel with the windshield, and therefore will not add to a car's wind resistance. Additionally, the warning light is emitted in an outward direction and thus will not interfere with the driver's vision, but is visible in the rear view mirrors of the cars ahead, as shown in FIG. 6.

Figure 5:
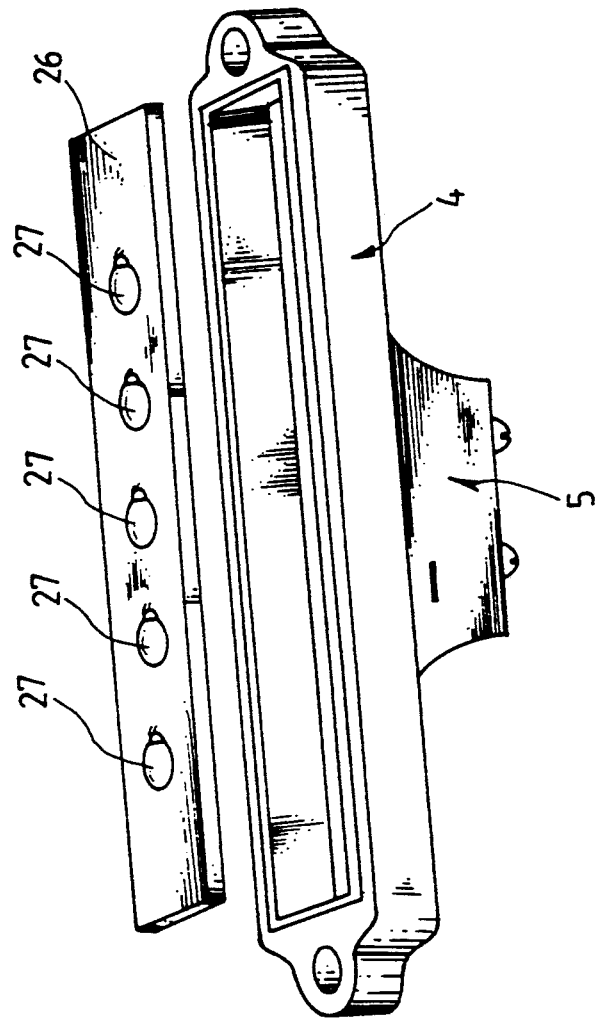
FIG. 5 shows structure of another kind of illumination assembly of the invention.

As FIG. 5 shows, illumination assembly 3 may alternatively be formed of a PC board 26 on which several light-emitting diodes 27 (LED) are installed, to substitute for the small lamp 16 and the full reflective board 15. The illumination of LEDs 27 obtains the same warning effect.

I claim:

1. A pressure increasing and warning aid for coupling to a windshield wiper, comprising:
   an opaque longitudinally extended wind pressure blade having an arcuate transverse cross-sectional contour, said wind pressure blade having a front and rear surface and a rectangular through opening formed centrally therein, a convex frame is formed about the periphery of said rectangular through opening and extends from said rear surface of said wind pressure blade, said wind pressure blade further having a pair of positioning struts extending from said rear surface, each of said positioning struts being disposed longitudinal on opposing sides of said rectangular through opening;
   a back case having front and rear sides secured on said front side to said rear surface of said wind pressure blade, said back case having on elongated rectangular cavity with an open end formed centrally therein and an annular recess formed about said open end of said cavity for receipt of said convex frame therein, said back case having an pair of holes formed on opposing sides of said rectangular cavity for respective receipt of said positioning struts therein, each of said positioning struts being secured within a respective one of said holes by a threaded fastener;
   clamping means coupled to said rear side of said back case for securing said back case to a windshield wiper arm, said clamping means including (1) a first clamping member integrally formed in said rear side of said back case, said first clamping member forming a first elongated U-shaped channel open on opposing ends and to one side, (2) a second clamping member formed of a metallic material, said second clamping member forming a second elongated U-shaped channel open on opposing ends and to one side, said second clamping member being insertable into said first channel of said first clamping member with said open side of said second clamping member facing a rear wall of said first channel to together define an elongated bore for enclosing the windshield wiper arm therein, and (3) a pair of threaded fasteners threadedly coupled through said first clamping member for clampingly engaging said second clamping member;
   illumination means disposed within said rectangular cavity for emitting light through said rectangular through opening of said wind pressure blade, said illumination means including light source means disposed within said rectangular cavity and a translucent plate member disposed within said rectangular through opening of said wind pressure blade to form a closure for said rectangular cavity and transmit light from said light source means.

2. The pressure increasing and warning aid as recited in claim 1 where said light source means includes (1) a lamp disposed at one end of said rectangular cavity, and (2) a longitudinally directed reflecting member disposed in said rectangular cavity with one end thereof adjacent said lamp and having a plurality of rows of transversely directed prisms formed on a rear side thereof, each of said prisms having inclined sidewall facing said lamp for directing light therefrom through a front surface of said reflecting member.

3. The pressure increasing and warning aid as recited in claim 1 where said light source means includes (1) a circuit board disposed within said cavity, and (2) a plurality of light emitting diodes mounted on said circuit board.

* * * * *